United States Patent
Didek et al.

[11] Patent Number: 5,603,210
[45] Date of Patent: Feb. 18, 1997

[54] DEVICE TO CONVEY FIBERS TO THE FIBER COLLECTION GROOVE OF AN OPEN-END SPINNING ROTOR

[75] Inventors: Stanislav Didek, Usti Nad Orlici; Petr Blazek, Chocen; Alois Stejskal, Usti Nad Orlici, all of Czechoslovakia

[73] Assignee: Rieter Ingolstadt Spinnereimaschinenbau AG, Ingolstadt, Germany

[21] Appl. No.: 185,874
[22] PCT Filed: Jun. 5, 1993
[86] PCT No.: PCT/DE93/00484
  § 371 Date: May 3, 1995
  § 102(e) Date: May 3, 1995
[87] PCT Pub. No.: WO93/25737
  PCT Pub. Date: Dec. 23, 1993

[30] Foreign Application Priority Data

Nov. 6, 1992 [CS] Czechoslovakia ............ 1770-92

[51] Int. Cl.⁶ .................................... D01H 4/00
[52] U.S. Cl. ............... 57/408; 57/406; 57/407; 57/411; 57/413
[58] Field of Search .................. 57/406, 407, 408, 57/411, 413, 415, 416, 417

[56] References Cited

U.S. PATENT DOCUMENTS

| | | | |
|---|---|---|---|
| 3,115,001 | 12/1963 | Cizek et al. | 57/413 |
| 3,620,002 | 11/1971 | Grishin | 57/413 |
| 3,844,100 | 10/1974 | Croasdale et al. | 57/417 |
| 3,845,612 | 11/1974 | Chisholm et al. | 57/416 |
| 3,875,733 | 4/1975 | Wehling | 57/417 |
| 3,910,023 | 10/1975 | Muller | 57/406 |
| 4,565,064 | 1/1986 | Iwasaki et al. | 57/413 |
| 5,414,990 | 5/1995 | Blazek et al. | 57/415 |

*Primary Examiner*—William Stryjewski
*Attorney, Agent, or Firm*—Dority & Manning

[57] ABSTRACT

The instant invention relates to a device for the feeding of fibers (51) to the fiber collection groove (23) of an open-end spinning rotor (2). The latter is covered by a rotor cover (3) whose side toward the spinning rotor (2) contains a fiber guiding element (8) the inner circumferential surface (12) of which, in form of a fiber guiding surface, forms a divergence angle (W1) widening in the direction of the spinning rotor (2). The fiber guiding element (8) extends coaxially into the spinning rotor (2). A fiber feeding channel (14) lets out tangentially into its inner circumferential surface (12).

15 Claims, 1 Drawing Sheet

DEVICE TO CONVEY FIBERS TO THE FIBER COLLECTION GROOVE OF AN OPEN-END SPINNING ROTOR

BACKGROUND OF THE INVENTION

The present invention relates to a device to convey fibers to the fiber collection groove of an open-end spinning rotor with a fiber guiding element extending coaxially into the spinning rotor and provided with an inner circumferential surface in the form of a fiber guiding surface into which a fiber feeding channel lets out tangentially.

In a known device of this type (DE-OS 2,319,428) a channel-shaped fiber guiding element is provided, along the circumferential wall of which the fibers are conveyed in a spiral to the spinning rotor. This channel has a cylindrical cross-section or a cross section representing a substantial portion of its length and tapering in the direction of the spinning rotor. Such a channel-shaped fiber guiding element not only requires much space but also has most certainly no positive influence on the fiber feeding into the spinning rotor. It has been shown for example, that the fibers become caught in the channel-shaped fiber guiding element and even lead to clogging. This known device could therefore not be introduced in practice.

OBJECTS AND SUMMARY OF THE INVENTION

It is therefore a principal object of the instant invention to create a device which is space saving and makes it possible to achieve trouble-free spinning operation as well as the production of high-quality yarns. Additional objects and advantages of the invention will be set forth in part in the following description, or may be obvious from the description, or may be learned by practice of the invention.

The objects are attained through the invention in that the spinning rotor is covered by a rotor cover whose side towards the spinning rotor contains the fiber guiding element, the inner circumferential surface of which includes a divergence angle opening in the direction of the spinning rotor. The fiber guiding element is in this case so small and compact that it fits in the rotor cover. The invention furthermore ensures undisturbed fiber feeding into the spinning rotor since its widening inner circumferential surface imparts a motion component in direction of the spinning rotor to the air which conveys the fibers and thereby also to the fibers themselves. Catching of the fibers due to centrifugal force is thereby prevented.

To make low-cost fabrication possible, the fiber guiding element is advantageously an integral part of the rotor cover.

In an easily fabricated embodiment of the invention, the inner circumferential surface of the fiber guiding element widens in the manner of a cone in the direction of the spinning rotor.

The divergence angle increases preferably from the outlet of the fiber feeding channel in the direction of the spinning rotor. In this manner, the friction effect which is produced by the inner circumferential surface of the fiber guiding element upon the fibers is counteracted so that even when the distance between the outlet of the fiber feeding channel and the spinning rotor is greater, fibers are reliably prevented from catching on the fiber guiding element.

In an advantageous embodiment of the device according to the invention the enlargement of the divergence angle is continuous, whereby the inner circumferential surface of the fiber guiding element is preferably arched in a convex manner.

In another advantageous embodiment of the invention, the increase of the divergence angle is discontinuous, i.e. in steps. In this case, the inner circumferential surface of the fiber guiding element is preferably composed in the axial direction of at least two longitudinal segments with different divergence angles. It has been shown to be advantageous for the longitudinal segment into which the fiber feeding channel lets out to be made in the form of a conical surface. The longitudinal segment of the fiber guiding element which is towards the spinning rotor can also be made in the form of a conical surface in that case.

In another advantageous embodiment of the invention, an additional convex longitudinal segment is provided between two conical longitudinal segments of the inner circumferential surface of the fiber guiding element.

In order to make it possible to easily exchange different spinning rotors being used optionally while space availability remains unchanged between an opener unit and the feeding device and the spinning rotor, provisions may be made in an advantageous embodiment of the invention for the longitudinal segment of the fiber guiding element towards the spinning rotor to be replaceable.

To ensure especially secure fiber transfer to the gliding wall of the spinning rotor, the invention advantageously provides for the fiber guiding element to protrude into the spinning rotor.

The term "cone" or "conical" does not only designate the mathematical/geometrical concept of a cone in itself, but also truncated cones and other cone-like configurations in the sense of the invention.

The design of the fiber guiding element in accordance with the invention not only makes it possible to achieve a significant technical success in the feeding of the fibers into the spinning rotor and thereby an improvement of yarn values, but the spinning device can be given a more compact configuration. It has been shown that the inner circumferential surface need not be very long in the axial direction. The distance between the outlet of the fiber feeding channel and the open edge of the fiber guiding element extending into the spinning rotor can be merely sufficiently great so that the fibers are able to collect in the air stream which is conveyed along the inner circumferential surface in the form of a spiral to the spinning rotor, so that they reach the spinning rotor at a contour line determined by the edge of the fiber guiding element. In this manner, good yarn values from the point of view of uniformity, strength, and elasticity are obtained. The invention can very easily be retrofitted in all current rotor spinning devices, and for this it generally suffices to replace the rotor cover.

Examples of embodiments of the invention are explained below through drawings.

DETAILED DESCRIPTION OF THE PREFERRED EMBODIMENTS

Figure 1:
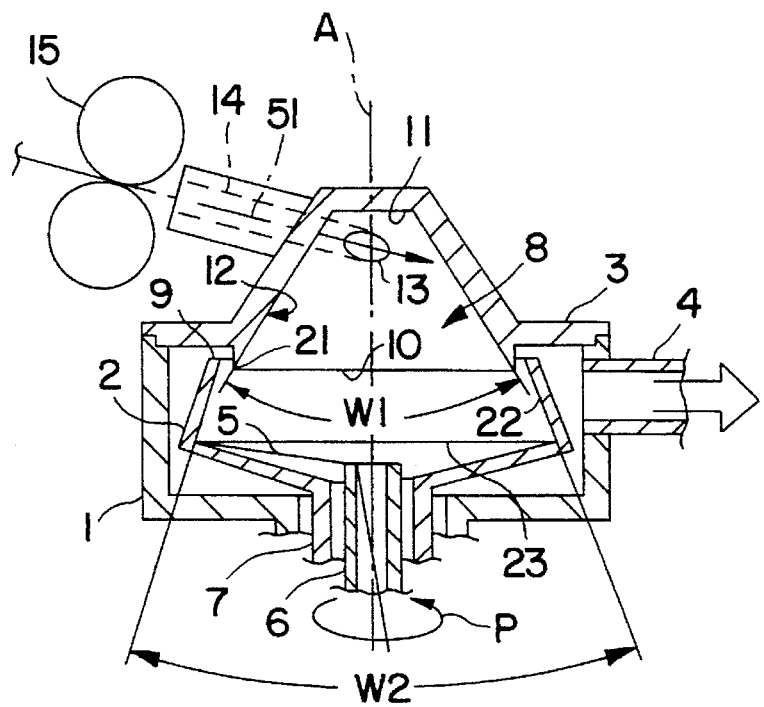
FIG. 1 shows a cross-section of an open-end spinning device with a rotor cover designed according to the invention, with integrated fiber guiding element.

Reference will now be made in detail to the presently preferred embodiments of the invention, one or more examples of which are illustrated in the drawings. Each example is provided by way of explanation of the invention, not limitation of the invention. The number of components is consistent throughout the description and drawings, with the same components having the same number throughout.

FIG. 1 shows the essential part of a conventional open-end rotor spinning device, and in it only the parts thereof which are necessary to understand the invention are shown.

The rotor spinning device, of which normally a plurality are placed next to each other in a spinning machine, is provided with a housing 1 in which spinning rotor 2 capable of being driven in the direction of arrow P is rotatably mounted in a manner not shown here by means of a shaft 7. The spinning rotor is normally provided with a gliding wall 22 widening from an open edge 9 to a fiber collection groove 23.

The housing 1 is provided with a rotor cover 3 covering the open side of the spinning rotor 2 and is connected by its interior space via an air line 4 to a source of negative pressure (not shown) to produce the negative spinning pressure.

A yarn draw-off pipe 6, which is located in the shown embodiment in the shaft 7 of the spinning rotor 2 made in the form of a hollow shaft and extending into the spinning rotor 2, is used to remove the yarn 5 from the spinning rotor 2.

A fiber guiding element 8 is installed in the rotor cover 3 on its side toward the spinning rotor 2 and coaxial with the spinning rotor 2, so that the geometric axis A of the fiber guiding element 8 coincides the rotational axis of the spinning rotor 2. This fiber guiding element 8 is an integral part of the rotor cover 3 and extends into the spinning rotor 2, whereby it ends with its outlet opening 10 inside the open edge 9 of the spinning rotor 2. The diameter of the fiber guiding element 8 is here close to the diameter of the open edge 9 of the spinning rotor 2. At its end away from the spinning rotor 2, the fiber guiding element 8 is closed by a forward wall 11.

The fiber guiding element 8 is provided with an inner circumferential surface 12 which serves as a fiber guiding surface and extends from the forward wall 11 of the fiber guiding element 8 to the outlet opening 10.

Within the inner circumferential surface 12 of the fiber guiding element 8 and at a distance from its outlet opening 10 is the outlet 13 of a fiber feeding channel 14 which starts at an opener and feeding unit 15 and merges tangentially into the inner circumferential surface 12. This fiber feeding channel 14 and its outlet 13, as well as the fiber guiding element 8, are designed so that an air stream is produced and introduced tangentially into the fiber guiding element 8 in the direction of rotation of the spinning rotor 2 as a result of the negative pressure in the air line 4, whereby the air stream carries along the fibers 51 and feeds them tangentially to the inner circumferential surface 12. This air stream leaves the spinning rotor 2 again through the gap between the open edge 9 of the spinning rotor 2 and the fiber guiding element 8.

Figure 2A:
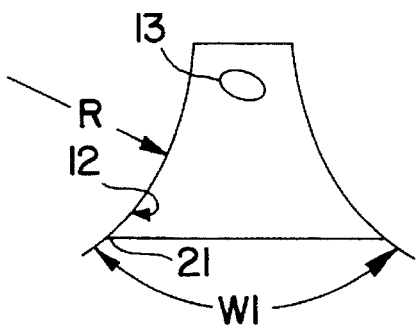
FIGS. 2a to 2d schematically show different configurations according to the invention of the inner circumferential surface of the fiber guiding element integrated into rotor cover.
Figure 2B:
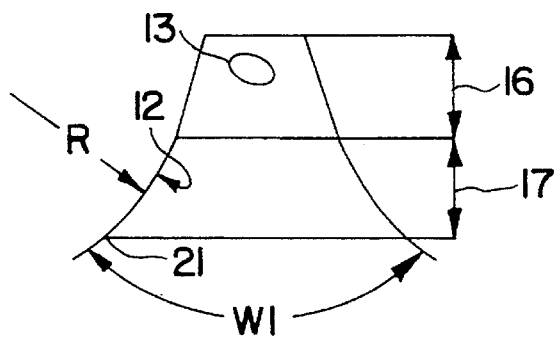
Figure 2C:
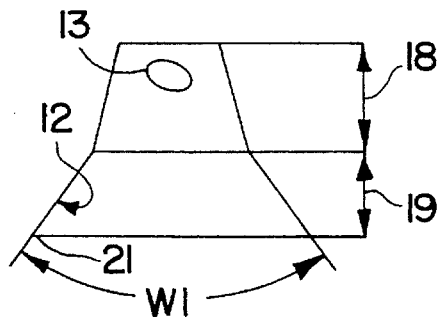
Figure 2D:
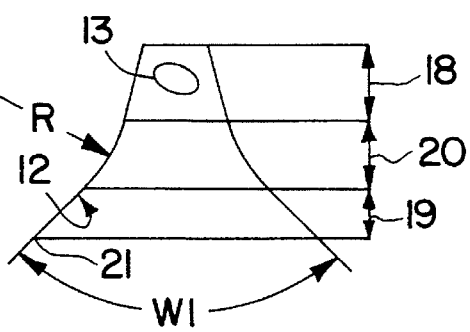

As FIG. 1 shows, the inner circumferential surface 12 widens in its entirety from the forward wall 11 to the outlet opening 10, i.e. the inner circumferential surface 12 thereby includes a divergence angle W1. Different versions of the special configuration of the inner circumferential surface 12 are possible and these depend on the spinning conditions, i.e. on different factors such as rotor speed, control of fiber feeding speed etc. Thus, this inner circumferential surface 12 widens according to FIG. 1 in the form of a cone or of a truncated cone. However, it may also be continuously curved for example, as shown in FIG. 2a (see curvature radius R) or it may consist of a conical (or truncated-conical) longitudinal segment 16 and a continuously curved longitudinal segment 17 which follows this first conical longitudinal segment 16 and extends to the outlet opening 10 (FIG. 2b). Alternatively, the inner circumferential surface 12 may also consist of at least two conical or truncated-conical longitudinal segments 18, 19 following each other as shown in FIG. 2c. According to another possible design, a curved longitudinal segment 20 is provided between at least two such conical longitudinal segments 18, 19 (FIG. 2d). Each of these inner circumferential surfaces 12 according to FIG. 1 or one of the FIGS. 2a to 2d diverges in the direction of the spinning rotor 2. This inner circumferential surface 12 is advantageously provided with a divergence angle W1 at least at location 21 where the fibers 51 leave the inner circumferential surface 12 during operation, the divergence angle W1 being greater than the divergence angle W2 of the ensuing gliding wall 22 of the spinning rotor 2.

In principle any of the configurations of the illustrated inner circumferential surface 12 advantageously ensures secure fiber transportation from the outlet 13 of the fiber feeding channel 14 to the gliding wall 22 of the spinning rotor 2. Thanks to the widening configuration of the inner circumferential surface 12 of the spinning rotor 2, the air with the fibers 51 which is conveyed to the spinning rotor 2 in circumferential direction of the inner circumferential surface 12 is gradually accelerated so that the resultant airstream conveys the fibers 51 to the outlet opening 10 of the fiber guiding element 8 while overcoming friction.

The velocity of the air which conveys the individual fibers 51, and its acceleration, depend not only on the conicity, i.e. the divergence angle W1 of the fiber guiding element 8, but substantially also on the speed with which the air again leaves the spinning rotor 2. This speed can be sized or controlled by means of an external source of negative pressure which aspires air from the spinning rotor 2 through the air line 4.

The configuration of the inner circumferential surface 12 in the form of a cone or truncated cone is especially easy to produce. The length of the inner circumferential surface 12 in the axial direction of the fiber guiding element 8 may be varied and depends essentially on the speed of the air stream conveying the individual fibers 51 and on the divergence angle W1. The lesser the air speed and the lower the divergence angle W1, the lower this length must be. If however the distance between the outlet 13 of the fiber feeding channel 14 and the outlet opening 10 of the fiber guiding element 8 is greater, it is especially advantageous if the greater friction acting upon the fibers 51 which is produced because of the longer distance is compensated for by increasing the divergence angle W1 from the outlet 13 of the fiber feeding channel 14 in the direction of the spinning rotor 2 and/or by increasing the air speed. The increase of the divergence angle W1 may be continuous, in uniform or non-uniform manner. Thus, as mentioned earlier in connection with FIG. 2a, the inner circumferential surface 12 of the fiber guiding element 8 may be uniformly arched in a convex manner.

According to FIGS. 2b to 2d, the enlargement of the divergence angle is discontinuous. According to FIGS. 2b and 2c two longitudinal segments 16 and 17 or 18 and 19 with different divergence angles W1 are provided for this. For manufacturing reasons the longitudinal segment 16 or 18 in which the outlet 13 of the fiber feeding channel 14 is located is preferably made in the form of a conical surface, by which also a surface in the form of a truncated cone is to be understood.

According to FIGS. 2c and 2d the longitudinal segment 19 of the inner circumferential surface 12 of the fiber guiding element 8 towards the spinning rotor 2 is also in the form of a conical surface. As mentioned earlier, the conical configuration can be produced very easily, e.g. by lathing.

The transition from one longitudinal segment to the next is discontinuous when two conical (or truncated-conical) longitudinal segments 18 and 19 follow each other (see FIG. 2c). If such a divergence discontinuity is to be avoided, e.g. in order to achieve a more uniform flow and thus to accelerate and stretch the fibers 51 continuously and in order to thus achieve optimal gliding of the individual fibers 51, the transition between these longitudinal segments 18 and 19 can be more gentle, in that an additional, convexly curved longitudinal segment 20 is provided between these two conical longitudinal segments 18 and 19.

During spinning operation, the opener and feeding device 15 is fed a fiber sliver (not shown) which is opened into individual fibers 51. Since air is aspired from the interior of the housing 1 during the operation of the described device as indicated earlier, an air stream which enters the fiber guiding element 8 in tangential direction in the sense of rotation of the spinning rotor 2, but with a deviation in direction of the spinning rotor 2 is produced as a result of this suction. The air stream is imparted a helicoidal movement in this manner, whereby this air stream has at the same time an axial motion component along the inner circumferential surface 12. The fibers 51 are taken up by the aforementioned air stream and are conveyed in such manner that they move in a straightened state with one fiber end ahead of the other. During the helicoidal movement of the air stream the centrifugal forces begin to act upon the fibers 51 which reach the inner circumferential surface 12 in a boundary layer. Since this inner circumferential surface 12 diverges in the direction of the spinning rotor 2, the centrifugal forces produce an axial force which causes the fibers 51 to move along the inner circumferential surface 12 in the direction of the spinning rotor 2. These axial components caused by the centrifugal force acts first upon the forward ends of the fibers 51 so that said fibers 51 are stretched and straightened during their transportation.

The air stream conveying the fibers moves, thanks to its guidance through the diverging inner circumferential surface 12, also in the direction of the axial component of the centrifugal force which acts upon the fibers 51. In this manner the control over the fibers 51 is never lost. There is no uncontrolled hurling of the fibers 51, and the fibers 51 are therefore always kept in a scattered state by the air stream such as is necessary for their further processing and are imparted the required direction of movement.

The air stream transporting the fibers 51 moves also at the outlet from the fiber guiding element 8 in a rotational direction so that the radial component of the centrifugal forces act upon the fibers 51. Here the forward end of every fiber 51 is transferred upon emerging from the fiber guiding element 8 to the rapidly moving gliding wall 22 of the spinning rotor while the air escapes through the gap between the open edge 9 of the spinning rotor 2 and the fiber guiding element 8 and through the air line 4. The velocities are selected so that the rotational speed of the gliding wall 22 of the spinning rotor 2 is in any case greater than the velocity of the fibers 51 in that direction. In this manner, the forward ends of the fibers 51 are pulled along by the friction of the fibers against the gliding wall 22, while the rear ends of the fibers 51 are pressed against the inner circumferential surface 12 by the centrifugal forces. This leads to additional straightening of the fibers 51 before being deposited in the spinning rotor 2 and being incorporated into the end of the yarn 5.

As they leave the fiber guiding element 8, the fibers 51 are distributed over its entire circumference and reach one and the same contour line—in relation to the plane going through the fiber collection groove 23—on the gliding wall 22 of the spinning rotor 2. It has been shown that such a fiber deposit on one and the same contour line of the spinning rotor 2 leads to especially good results with regards to yarn quality, e.g. tear resistance, elasticity and uniformity.

As the above description shows, the device can be modified in many ways within the framework of the invention, e.g. by replacing certain characteristics by equivalents or by using them in different combinations. Nor is the manner important in which the air stream conveying the fibers 51 is produced in individual cases. Thus, it may be produced by a source of negative pressure, as described, or by the spinning rotor 2 itself. In the first instance the housing 1 is connected as shown to a source of negative pressure. The source of negative pressure may however remove the conveying air also directly from the spinning rotor 2, e.g. through the shaft 7 of the spinning rotor 2 which would be a hollow shaft, or through a suction channel extending through the rotor cover 3 into the spinning rotor 2 (going through the fiber guiding element 8). In the second instance, ventilation openings distributed in a circle are provided in the spinning rotor 2 to produce a negative pressure within the spinning rotor 2 as a result of its rotation. In both cases, it is however essential that this air stream be conveyed through the fiber guiding element 8 to the interior of the spinning rotor 2.

If the spinning rotor 2 is provided with ventilation openings and produces the negative spinning pressure itself due to its rotation, it is also possible to have air penetrate through the gap between the fiber guiding element 8 and the spinning rotor 2 into the interior of the spinning rotor 2. If the spinning rotor 2 is installed in a closed housing (not shown), the air introduced into the spinning rotor 2 through the gap may be the air which previously left the spinning rotor 2 through its ventilation openings as a result of its rotation. If the chamber enclosed by the housing is subdivided, it is alternatively possible for the air stream leaving the spinning rotor 2 through the ventilation openings to be removed from the housing through a first chamber, while another air stream is introduced into the gap and into the spinning rotor 2 through a second chamber. In any case, care must be taken that the additional air fed to the spinning rotor through the fiber guiding element 8 is again removed from the latter. At least when the air leaving the spinning rotor 2 through the ventilation openings reenters the spinning rotor 2 through the gap, an additional suction must be provided. This may be connected to the hollow shaft 7 of the spinning rotor 2, whereby the yarn draw-off pipe 6 then extends preferably through the interior of the fiber guiding element 8 into the spinning rotor 2.

In the embodiment shown, the fiber guiding element 8 overlaps the spinning rotor 2 towards the inside. If air can be conveyed through the gap between spinning rotor 2 and fiber guiding element 8 into the interior of the rotor, it may in some cases be possible to eliminate the overlap of the fiber guiding element 8 since fiber loss is avoided by the air flowing into the spinning rotor. The relative positions of the outlet opening 10 and the open edge 9 of the spinning rotor 2 can be used to influence the orientation of the air flowing into the spinning rotor 2, and thereby the deposit of the individual fibers 51 on the gliding wall 22 of the spinning rotor 2.

It is not absolutely necessary to make the shaft 7 of the spinning rotor 2 hollow, since the yarn draw-off pipe 6, in a variant from the shown embodiment, can also be taken through the rotor cover 3 (and through the fiber guiding element 8).

In the embodiment according to FIG. 1, the fiber guiding element 8 is an integral part of the rotor cover 3. This makes it possible to achieve especially low-cost fabrication. However, if different fiber guiding elements 8 are to be used optionally to adapt to different spinning conditions, it may be advantageous for the fiber guiding element 8 to be attached to the rotor cover 3 in such manner that it can be replaced. Here again different designs are of course possible, depending on the configuration of the rotor cover 3, etc. For example, the fiber guiding element 8 may be installed on the side of rotor cover 3 towards the spinning rotor 2. If the fiber guiding element 8 has a greater axial extension, the rotor cover 3 may alternatively be provided with a recess into which the fiber guiding element 8 is inserted. In this manner it is possible to replace the fiber guiding element 8 easily and independently of the rotor cover 3 with a fiber guiding element 8 which is adapted in a special manner to the spinning rotor 2 to be used. It is also possible to replace the fiber guiding element 8 when this is necessary because of wear, without having to replaced the rotor cover 3 at the same time.

When the fiber guiding element 8 contains several longitudinal segments 16 and 17 or 18 and 19 or else 18, 20 and 19 as shown in FIGS. 2b to 2d, such a replacement need not necessarily be made for the entire fiber guiding element 8. Depending on the reason for replacement it may suffice if only the longitudinal segment 17 or 19 toward the spinning rotor is replaced, while the longitudinal segment 16 or 18 is not replaced. In a fiber guiding element 8 with three or more longitudinal segments, the middle segment 20 or the middle segments can also be replaced if this is useful. Correspondingly, the fiber guiding element 8 must then subdivided into two parts of which one contains at least the longitudinal segment 16 or 18 with the outlet 13 of the fiber guiding element 8 and can be excluded from the replacement (but need not be), while the other comprises at least the longitudinal segment 17 or 19 and can be removed and replaced.

Such a replaceability of the parts of the fiber guiding element 8 is especially advantageous when spinning rotors 2 with different diameters are used. The longitudinal segment 16 or 18 of the fiber guiding element 8 remains unchanged, whatever the configuration or the size of the spinning rotor 2, so that the distance or the position of the opener and feeding device 15 in relation to the spinning rotor 2 (or vice versa) need not be changed. Thus the geometric relationships between opener and feeding device 15 and the fiber feeding channel 14 also remain unchanged. To adapt to a different rotor configuration or size, a longitudinal segment 17 or 19 (and possibly a longitudinal segment 20 preceding it or several such intercalated longitudinal segments) is replaced by an appropriately different divergence angle W1 so that the fiber guiding element 8 ends in any case in immediate proximity of the gliding wall 22 of the spinning rotor 2.

It will be apparent to those skilled in the art that various modifications and variations can be made in the present invention without departing from the scope or spirit of the invention. For example, features illustrated as part of one embodiment can be used on another embodiment to yield a still further embodiment. It is intended that the present invention cover such modifications and variations as come within the scope of the appended claims and their equivalents.

We claim:

1. A device for feeding fibers from a fiber feeding channel to a fiber collection groove of an open-end spinning rotor having an open side which is covered by a rotor cover, said device comprising a fiber guiding element disposed opposite said open side of said rotor, said fiber guiding element comprising an inner circumferential surface defining a fiber guiding surface, said fiber guiding surface diverging towards said rotor and forming an opening angle in the direction of said rotor, said fiber guiding element further comprising a tangential opening defined in said fiber guiding surface, said opening tangential with respect to a spinning axis of said spinning rotor in a direction corresponding to a rotational direction of said spinning rotor, said fiber feeding channel in communication with said opening so that an air stream is produced and introduced tangentially into the fiber guiding element in the direction of rotation of said spinning rotor, the tangential air stream carrying fibers tangentially to said fiber guiding surface.

2. The device as in claim 1, wherein said fiber guiding element is defined within said rotor cover.

3. The device as in claim 2, wherein said fiber guiding element is formed integral with said rotor cover.

4. The device as in claim 1, wherein said opening angle of said fiber guiding surface increases from said opening in the direction of said rotor.

5. The device as in claim 1, wherein said fiber guiding surface widens conically in the direction of said rotor.

6. The device as in claim 1, wherein said fiber guiding surface defines a continuous opening angle.

7. The device as in claim 6, wherein said fiber guiding surface is uniformly convex.

8. The device as in claim 1, wherein said fiber guiding surface defines a discontinuous opening angle.

9. The device as in claim 8, wherein said fiber guiding surface comprises at least two longitudinal segments defining different opening angles towards said rotor.

10. The device as in claim 9, wherein one of said longitudinal segments adjacent said opening defines a conical surface.

11. The device as in claim 9, wherein one of said longitudinal segments adjacent said rotor defines a conical surface.

12. The device as in claim 9, further comprising a third longitudinal segment between said two longitudinal segments.

13. The device as in claim 12, wherein said third longitudinal segment defines a convex surface and said first and second longitudinal segments define conical segments.

14. The device as in claim 9, wherein said longitudinal segment adjacent said rotor is replaceable.

15. The device as in claim 11, wherein said fiber guiding element is disposed so as to extend into said rotor.

* * * * *